US009112377B2

(12) United States Patent
Sechrist

(10) Patent No.: US 9,112,377 B2
(45) Date of Patent: Aug. 18, 2015

(54) REMOTE DEVICE CONTROL AND POWER SUPPLY

(75) Inventor: William Stuart Sechrist, Simi Valley, CA (US)

(73) Assignee: AEROVIRONMENT, INC., Monrovia, CA (US)

( * ) Notice: Subject to any disclaimer, the term of this patent is extended or adjusted under 35 U.S.C. 154(b) by 818 days.

(21) Appl. No.: 13/428,960

(22) Filed: Mar. 23, 2012

(65) Prior Publication Data

US 2012/0181857 A1 Jul. 19, 2012

Related U.S. Application Data

(63) Continuation of application No. 12/565,337, filed on Sep. 23, 2009, now Pat. No. 8,148,843.

(60) Provisional application No. 61/194,055, filed on Sep. 23, 2008.

(51) Int. Cl.
*B60L 1/00* (2006.01)
*H02J 1/08* (2006.01)
*H02J 1/00* (2006.01)

(52) U.S. Cl.
CPC ............. *H02J 1/08* (2013.01); *B64D 2221/00* (2013.01); *H02J 2001/008* (2013.01)

(58) Field of Classification Search
CPC ..... H02J 1/08; H02J 2001/08; H02D 2221/06
USPC .............................................. 307/9.1; 361/92
See application file for complete search history.

(56) References Cited

U.S. PATENT DOCUMENTS

| 3,782,167 | A | 1/1974 | Stuelpnagel |
| 4,143,410 | A | 3/1979 | Cronin |
| 4,816,828 | A | 3/1989 | Feher |
| 5,255,880 | A | 10/1993 | Lyloc et al. |
| 5,612,579 | A | 3/1997 | Wisbey et al. |
| 5,626,312 | A | 5/1997 | Head |
| 5,764,502 | A | 6/1998 | Morgan et al. |

(Continued)

OTHER PUBLICATIONS

Fink, Donald G, "Standard Handbook for Electrical Engineers." McGraw-Hill, Inc., 1968, Tenth Edition, Section 10, pp. 112-123.

(Continued)

*Primary Examiner* — Rexford Barnie
*Assistant Examiner* — Toan Vu
(74) *Attorney, Agent, or Firm* — Brinks Gilson & Lione; Eric Aagaard

(57) ABSTRACT

An actuator controller with a power supply that steps down a high voltage for use by remote auxiliary loads in an aircraft is provided. A high voltage power bus running through the aircraft may use high gage or smaller diameter wiring, resulting in weight savings in the power bus. A control network running through the aircraft may use fiber optic cabling, providing further weight reductions. An actuator controller may receive the high voltage from the power bus and provide a lower voltage to a remote device. The actuator controller may facilitate communication between the control network and the remote device. The integration of control and power supply may enhance endurance, reliability, and enable localized calibration of the remote device. Modular wing components may include interface controllers, high and low power busswork, and remote devices. The modular wing components may include power and control interconnections.

19 Claims, 5 Drawing Sheets

(56) References Cited

U.S. PATENT DOCUMENTS

| | | | |
|---|---|---|---|
| 5,850,113 | A | 12/1998 | Weimer et al. |
| 6,181,027 | B1 | 1/2001 | Grady |
| 6,483,865 | B1 | 11/2002 | Beierle |
| 6,763,242 | B1 | 7/2004 | Feria et al. |
| 6,873,886 | B1 * | 3/2005 | Mullen et al. .................... 701/2 |
| 7,176,421 | B2 | 2/2007 | Silva et al. |
| 2002/0065594 | A1 | 5/2002 | Squires et al. |
| 2003/0048007 | A1 | 3/2003 | Mercier et al. |
| 2006/0042846 | A1 * | 3/2006 | Kojori et al. ................ 180/65.8 |
| 2006/0044722 | A1 | 3/2006 | Wavering et al. |
| 2006/0061212 | A1 * | 3/2006 | Uchiyama .................... 305/167 |
| 2007/0007385 | A1 | 1/2007 | Potter et al. |
| 2008/0100136 | A1 | 5/2008 | Langlois et al. |
| 2008/0208396 | A1 * | 8/2008 | Cairola et al. ................... 701/3 |

OTHER PUBLICATIONS

PCT/US2009/058035, International Filing Date: Sep. 23, 2009, PCT International Search Report and Written Opinion of the International Searching Authority, mailed Nov. 10, 2009, 11 pages.

PCT/US2009/058035, International Filing Date: Sep. 23, 2009, PCT International Preliminary Report on Patentability, mailed Apr. 7, 2011, 10 pages.

U.S. Appl. No. 12/565,337, filed Sep. 23, 2009, Office Action, mailed Aug. 4, 2011, 21 pages.

Search and Examination Report for related Singapore Application No. 201102703-4, dated Sep. 6, 2012 (13 pages).

\* cited by examiner

REMOTE DEVICE CONTROL AND POWER SUPPLY

RELATED APPLICATION

This application is a continuation application of U.S. patent application Ser. No. 12/565,337, filed Sep. 23, 2009 and entitled "Remote Device Control and Power Supply," which claims priority to U.S. Provisional Patent Application No. 61/194,055, filed Sep. 23, 2008, both of which are incorporated herein by this reference in their entireties.

FIELD

The present invention relates generally to aircraft. More particularly, the present invention relates to enhancing control and power supply to remote devices located throughout an aircraft.

BACKGROUND

The way that the Vietnam War is now remembered as the helicopter war, the current conflicts in Iraq and Afghanistan may be remembered for the use of unmanned drones. Drones may facilitate remote intelligence gathering, alleviating the need for foot soldiers to enter into hostile areas "blind," with little or no information about the location and strength of hostile forces. Drones may provide close combat support, such as identifying and eliminating targets of interest, alleviating the need to expose soldiers and/or airmen to potential small arms fire, mortars, rocket grenades, road-side bombs, anti-aircraft weaponry, missiles, and other dangers.

With aircraft generally there is a long felt need to enhance performance. Prior improvements include those disclosed in U.S. Pat. No. 4,816,828 (fiber optics interconnected with cameras), U.S. Pat. No. 5,255,880 (fiber optics interconnected with a column signal generator), and U.S. Pat. No. 4,143,410 (miniature gage control wiring). However, the operational capabilities of conventional aircraft and unmanned drones remain limited.

BRIEF SUMMARY

The disclosed system and method may enhance endurance, maneuverability, operational capability, and/or maximum sustainable altitude of an aircraft. An actuator interface controller may be provided that interfaces with a remote device located throughout the aircraft, such as in the wings, the tail, landing gear, the fuselage, and other locations. The interface controller may accept a high voltage from a high voltage power bus, and then provide a stepped down or lower voltage to a low voltage power bus to power the remote device. The interface controller may relay commands received from a control network that direct the operation of the remote device. The interface controller may provide signal conditioning for (a) command signals sent from a local processor located on the interface controller to the remote device, and (b) feedback signals received from the remote device. The interface controller may communicate the feedback related to the operation of the remote device to the control network.

In one embodiment, a system for supplying power to a remote auxiliary load located in an aircraft may be provided. The system may include an actuator interface controller located in the aircraft comprising a power supply. The power supply may be interconnected with a high gage wire and a low gage wire, with the high gage wire being of higher gage wiring than the low gage wire. The high gage wire may act as a high voltage power bus and provide a high voltage input to the power supply. The power supply may be configured to step down the high voltage received to a low voltage that is lower than the high voltage on the high voltage power bus and place the low voltage onto the low gage wire that may act as a low voltage power bus. The low voltage power bus may be interconnected with the remote auxiliary load and provide the low voltage to the remote auxiliary load. The remote auxiliary load may be located at a distance from a power plant of the aircraft. As a result, both a length of low gage wiring acting as a low voltage power bus and a longer length of relatively lighter high gage wire acting as a high voltage power bus may be used to relay power from the power plant of the aircraft to the remote auxiliary load, reducing an overall weight of wiring located in the aircraft required to supply power to the remote auxiliary load.

In another embodiment, a system for supplying power to a remote device located in an aircraft may be provided. The system may include an actuator interface controller interconnected with a high voltage power bus and having a power supply. The power supply may be configured to reduce a high voltage received from the high voltage power bus to a low voltage of a low voltage power bus and to place the low voltage onto the low voltage power bus exiting the actuator interface controller. The high voltage power bus have a first thickness and a first weight per unit distance. The low voltage power bus may have a second thickness and a second weight per unit distance. The low voltage of the low voltage power bus may be less than the high voltage of the high voltage power bus. The second thickness and the second weight per unit distance of the low voltage power bus may be greater than the first thickness and the first weight per unit distance of the high voltage power bus such that the high voltage power bus is comparatively lighter than the low voltage power bus per unit distance. The system may include a remote device interconnected with the low voltage power bus and that is powered from the low voltage carried by the low voltage power bus. As a result, power may be transmitted to the remote device over both the low voltage power bus and the relatively lighter high voltage power bus, reducing an overall weight of wiring in the aircraft required to supply power to the remote device.

In another embodiment, a method of controlling and supplying power to a remote device located in an aircraft may be provided. The method may include providing an interface controller located at a first position in the aircraft, and interconnecting a high gage wire with the interface controller. The high gage wire may run from a power plant located in the fuselage of the aircraft to the interface controller located at the first position for a first distance. The method may include interconnecting a comparatively lower low gage wire with respect to the high gage wire to the interface controller. The low gage wire may run from the interface controller to the remote device located at a second position in the aircraft for a second distance. The high gage wire may have less weight per unit distance and thickness than the lower gage wire. The method may include placing a high voltage generated from the power plant located in the fuselage onto the high gage wire running to the interface controller, and stepping down the high voltage via a voltage converter associated with the interface controller to a low voltage that is lower than the high voltage and placing the low voltage onto the low gage wire to power the remote device. As a result, the remote device located in the aircraft is transmitted power from the power plant located in the fuselage over both low gage wire and relatively lighter high gage wire thereby reducing an overall weight of the wiring in the aircraft required to power the remote device.

Advantages will become more apparent to those skilled in the art from the following description of the preferred embodiments which have been shown and described by way of illustration. As will be realized, the system and method are capable of other and different embodiments, and their details are capable of modification in various respects. Accordingly, the drawings and description are to be regarded as illustrative in nature and not as restrictive.

DETAILED DESCRIPTION

Figure 1:
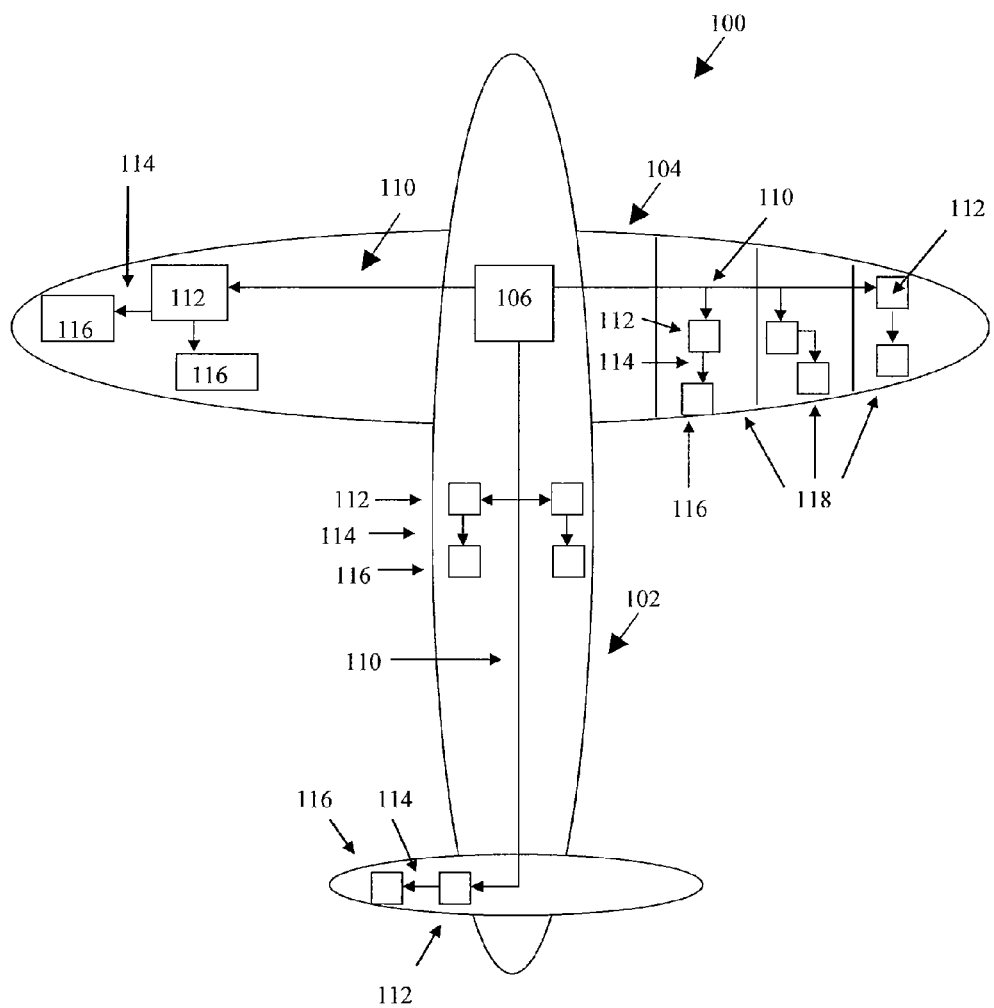
FIG. 1 illustrates an exemplary schematic of an aircraft.

A system and method may integrate controlling and supplying power to remote devices located in an aircraft via an actuator interface controller. Each remote device may be located in the wing, the fuselage, the tail, the landing gear, and other locations on the aircraft. Similarly, the interface controller may be located in the wing, the fuselage, the tail, the landing gear, and other locations of the aircraft, and preferably in the vicinity of a corresponding remote device. The interface controller may receive a high voltage from a high voltage power bus and provide a stepped down lower voltage onto a low voltage power bus to power the remote device. The interface controller may include a local processor that directs the operation of the remote device.

The high voltage power bus may run from a power plant of the aircraft to the interface controller. The high voltage power bus may comprise a thinner and/or lighter weight wiring than the low voltage power bus, and may extend approximately the same or greater distance within the aircraft as compared with the length of the low voltage power bus. In turn, the relatively heavier low voltage power bus may extend a relatively short distance from the interface controller to the remote device, and thus reducing weight.

The interface controller may be in data communication with both the remote device and a control network controlling the aircraft. The interface controller may be connected to the control network via fiber optic cable, and may use a signal conditioner to facilitate communication with the remote device. The interface controller may include a local processor that directs the operation of the remote device and provides operational feedback received from the remote device to the control network. The remote devices may include servo controllers, actuators, lights, sensors, brakes, transmitters, receivers, video recorders, antennas, weapons, temperature monitors, speed detectors, other aircraft hardware, other electrical or mechanical devices, and/or other auxiliary loads.

As discussed herein, the interface controller may reduce the weight of the wings and signal interference. The interface controller may also enhance modularity, reliability, and control of the aircraft.

I. Integration of Remote Device Control and Power Supply

A single interface controller may integrate remote device control and power supply locally with respect to a remote device. The interface controller may be configured to accommodate many types of remote devices. To support different types of remote devices, the interface controller may be configured to have software and/or hardware specifically tailored for each remote device or type of remote device.

The interface controller may be configured to operate as a bridge between the control network and the remote devices. To operate as a bridge from a control network, such as from a main controller of the control network, to one or more remote devices, the interface controller may interface with (1) a main or other power bus, (2) a fiber optic network, and/or (3) one or more remote devices. The inputs to, and the outputs from, the interface controller may include both power and control signals. The interface controller may generate a low voltage power signal and place it onto a low voltage bus. The low voltage bus may be interconnected with and supply power to the remote devices located in the wings, the fuselage, the tail, landing gear, and other locations of the aircraft. The interface controller may generate control signals that direct the operation of the remote devices. The interface controller may transmit data to, and receive data from, each associated remote device that is controlled by the interface controller.

II. Aircraft Wire Weight Reduced

Weight reduction may be achieved through the use of a lighter weight high voltage transmission line to provide power to the interface controller and a local power supply. The high voltage may be converted locally at the interface controller to a lower voltage that is usable to power both the interface controller and remote devices.

The high voltage bus that is input to the interface controller may enable weight savings with respect to the aircraft, including weight savings in the wings, the fuselage, tail, and other locations. Using a high voltage bus voltage to feed remote interface controllers located in the aircraft may permit a much smaller-sized and lighter weight conductor to be employed for a required current.

Further weight reduction may be realized through the use of fiber optic cabling, which may replace heavier conventional wires, such as copper cables. Fiber optic cables may be used to relay control signals to and from a main controller. The interface controller may communicate with a control network and/or the main network controller via a fiber optic interface interconnected with a local processor located on the interface controller.

As an example, the weight of a standard fiber optic cable may be approximately 2.5 grams per meter. A traditional copper wire may weigh approximately 4.5 grams per meter. With conventional techniques, two copper conductors may be required—one copper wire may be used to send signals to a remote load, and a second copper wire may be used to receive signals from the remote load. As a result, the actual weight of a traditional signal pair may be approximately 9 grams per meter, i.e., 4.5 grams per meter multiplied by two. On the other hand, fiber optic cabling may be bidirectional, i.e., requiring only a single cable. Thus, fiber optics may provide between approximately 60% and 80% the weight savings as compared with traditional copper wiring signal pairs.

III. Long Distance Transmission of Data and Control Signals

Fiber optic transducers may allow very long transmission distances and high data rates of communication to be achieved, which may be favorable in large aircraft. For instance, large aircraft may have relatively large wings in which remote devices may be required to be physically placed far away from each other and/or the fuselage. Fiber optics may quickly carry control signals over those distances that direct the operation of the remote devices, such as in the form of light signals.

IV. System Reliability

The present embodiments may reduce signal interference and enhance modularity, component interchangeability and replacement, local calibration, and/or local grounds, all of which may enhance overall system reliability.

A. Electromagnetic Interference Immunity

Electromagnetic interference may be caused by equipment located on the aircraft, such as motors, generators, payloads, antennas, transmitters, receivers, propellers, and other electrical equipment. Electromagnetic interference may also be radiated from nearby aircraft, or land-based sources and transmitters.

However, fiber optic cabling may be immune to electromagnetic interference. A modern fiber optic cable may be constructed to minimize the possibility that external signals, originating from the aircraft's own equipment or elsewhere, may interfere with the data being transmitted and received within the aircraft. Thus, signals traveling along fiber optic cables may not be highly susceptible to electro-magnetic interference.

The noise immunity provided by fiber optics may be very favorable in critical aircraft systems. Modern fiber optic transducers may allow data and control signals to be reliably transmitted over very long distances, and at high data rates of communications. As noted above, this may be advantageous in larger aircraft that include remote devices physically located at a large distance from the fuselage and/or main controller.

B. Modularity

The present embodiments may provide for modular wing panels, interface controllers, and other components. An outer or other wing panel may be interchangeable with a replacement wing panel. A wing may comprise a number of wing panels, and each wing panel may be replaced along with all of the components located within the wing panel. The replacement wing panel itself may include additional, fewer, or alternative replacement interface controllers and/or remote devices as compared with the original wing panel being replaced.

A replacement remote device located within the replacement wing panel may already be calibrated prior to interchanging wing panels. As a result, the replacement wing panel may only require interconnecting the power and network connections, which may facilitate a quick and efficient replacement of the wing panel and the associated components. Alternatively, the replacement remote device may be locally and automatically calibrated once the replacement wing panel is installed by the replacement interface controller running one or more embedded software routines.

Additionally, an interface controller itself may be interchangeable with other interface controllers. Each interface controller may have a number of electrical pins. The electrical pins may interconnect the interface controller with the wing and hold the interface controller physically in place. The electrical pins may facilitate efficient physical interchangeability of each interface controller.

C. Local Calibration

An interface controller may provide localized scaling and calibration of data from sensors and other remote devices. Each interface controller may facilitate digital interconnection with one or more remote devices located in a specific portion of the wing. If an interface controller is to be replaced, such as with another interface controller that includes additional or different software and/or hardware, recalibration may only be necessary with respect to the remote devices interconnected with the interface controller being replaced.

Locally storing calibration and other data in a memory located on the interface controller may shorten transmission times of data and commands being sent to the remote devices. Likewise, the time required to receive feedback signals transmitted from the remote devices at the interface controller may be shortened. Therefore, a recalibration procedure that only requires local calibration of a remote device (located in a wing tip, tail section, or other aircraft portion) that is directed by a replacement interface controller may allow for swapping out mission specific interface controllers and remote devices.

D. Local Power Conversion

An interface controller may provide local power conversion. Stepped down power conversion in the vicinity of one or more remote devices may facilitate modular replacement of the low voltage power supplies located on the interface controllers.

The level of a low voltage provided locally may be more accurate by providing one or more local grounds throughout the wing, the fuselage, the tail, or other aircraft locations. Long power busswork covering a distance may result in voltage droop along that distance. As a result, the voltage at any given point may be uncertain. Having unreliable or insufficient voltage being applied to the remote devices may degrade operation. With the present embodiments, each interface controller may include a local ground, and the length that each portion of power busswork runs from ground to ground may be minimized by using a plurality of interface controllers, such as in series, or using other multiple local grounds.

E. Fault Detection and Automatic Reboots

An interface controller may have embedded software that allows a local processor located on the interface controller to reboot itself. If there is fault or external event that causes the interface controller to drop offline, the interface controller may reboot itself automatically.

As an example, the interface controller may include a local processor that continuously runs "check health" routines. The local processor may quickly and automatically reboot itself if it detects an external event, such as a lightning strike, a blown fuse, a power surge, or other event. The reboot functionality may eliminate a need for a back-up power supply being located on the interface controller, such as a battery. Upon detecting an external event, the local processor may generate and transmit warning alarm signals to the control network or a main controller. Alternatively, the warning alarm signal may be processed locally.

The local processor may query for calibration data or the calibration data may be stored locally. Local processing in the vicinity of the remote devices may provide for quicker response time as compared to more distant control. Local processing may provide local filtering and control of various runtime loops. An exemplary runtime loop may direct the operation of the remote device and provide feedback, such as servo positioning associated with a remote device.

V. Exemplary Aircraft

FIG. 1 is an exemplary schematic of an aircraft 100 employing actuator interface controllers 112. The aircraft 100 may include a fuselage 102, wings 104, a power plant 106, high voltage power busswork 110, interface controllers 112, low voltage power busswork 114, remote devices 116, and modular wing components 118. The aircraft 100 may include additional, fewer, or alternate components.

The high voltage power busswork 110 may run from a power plant 106 of the aircraft 100 to each interface controller 112. The power plant 106 may place a high voltage onto the high voltage power busswork 110. The power plant 108 of the aircraft may be located in the fuselage 102, or in the wings 104. The power plant 108 may be an internal combustion engine, a propeller driven generator, a battery, solar array, or other type of power plant. In one embodiment, the relatively high voltage may be between approximately 60 V and approximately 600 V, and preferably about 350 V. Other high voltages may be used.

The high voltage power busswork 110 may run from the power plant 106 and/or the fuselage 102 and through the fuselage 102 to interior of the wings 104 and/or the tail section. In the wings 104 and/or the fuselage 102, the high voltage power busswork 110 may be interconnected with one or more interface controllers 112. The interface controllers 112 may reduce or step down the high voltage on the high voltage power busswork 110 to a comparatively lower voltage (lower relative to the high voltage). The interface controllers 112 may then place the stepped down lower voltage onto low voltage power busswork 114.

The low voltage power busswork 114 may extend from an interface controller 112 to one or more associated remote devices 116. The remote devices 116 may be powered from the low voltage being supplied by the low voltage power busswork 114. The remote devices 116 may include servos, sensors, actuators, cameras, transmitters, receivers, imaging devices, video recorders, and other auxiliary loads, including those noted elsewhere herein. The low voltage may be between approximately 5 V and approximately 60 V, and preferably about 28 V. Other low voltages may be used, including approximately 12 V.

The low voltage on the low voltage power busswork 114 may require a relatively heavy cable for transmission. On the other hand, the high voltage busswork 110 carrying a higher voltage may comprise comparatively smaller and lighter wiring. The high voltage busswork 110 may include approximately 24 gage wiring to approximately 36 gage wiring. The low voltage busswork 114 may comprise relatively thicker and heavier wiring, such as approximately 12 gage to approximately 24 gage wiring.

In general, a higher gage wire by number is smaller in diameter than a lower gage wire by number. For instance, a 12 gage wire is much larger in diameter than a 30 gage wire. Solid wire diameter may increase by a factor of 2 for every 6 gages, or by a factor of 3 every 10 gages. A 36 gage wire may have diameter of about 5 mils, a 30 gage wire may have a diameter of about 10 mils, a 24 gage wire may have a diameter of about 20 mils, and a 10 gage wire may have a diameter of about 100 mils.

Also, a larger in diameter wire may carry more current. For instance, a ten gage wire may be safe for about 30 amps, while a 16 gage wire may be safe for only about 7.5 amps. Thus, the high voltage busswork 110 may be smaller in diameter and operable to safely carry less current than the low voltage busswork 114, while carrying a higher voltage than the low voltage busswork 114.

The relatively lighter wiring associated with the high voltage power busswork 110 may be run approximately the same or a longer distance within the aircraft than the comparatively heavier wiring associated with the low voltage power busswork 114. For instance, as depicted by FIG. 1, the distance from the power plant 106, especially if the power plant 106 is located in the fuselage of the aircraft, to a remote interface controller 112 located in a large wing or the tail may be significantly greater than the distance from the remote interface controller 112 to a remote device 116 located in the vicinity of the interface controller 112 in the wing. Interface controllers may also be positioned at other locations, such as in the fuselage or on landing gear. As a result, weights savings in the aircraft, and especially in the wings, associated with the power busswork required to deliver power to the remote devices located in throughout the aircraft may be achieved.

The wings 104 may comprise a number of modular wing components 118. A number of modular wing components 118 may be prefabricated to be interchangeable and interconnectable with other modular wing components 118. Each modular wing component 118 may include one or more interface controllers 112, one or more remote devices 116, a portion of high voltage power busswork 110, and a portion of low voltage power busswork 114. Each modular wing component 118 may provide common (1) network connections, (2) high voltage power busswork connections, and (3) low voltage power busswork connections. For instance, the network and power busswork may be segmented, but subsequently interconnected via a number of modular wing components 118.

VI. Exemplary Interface Controller

Figure 2:
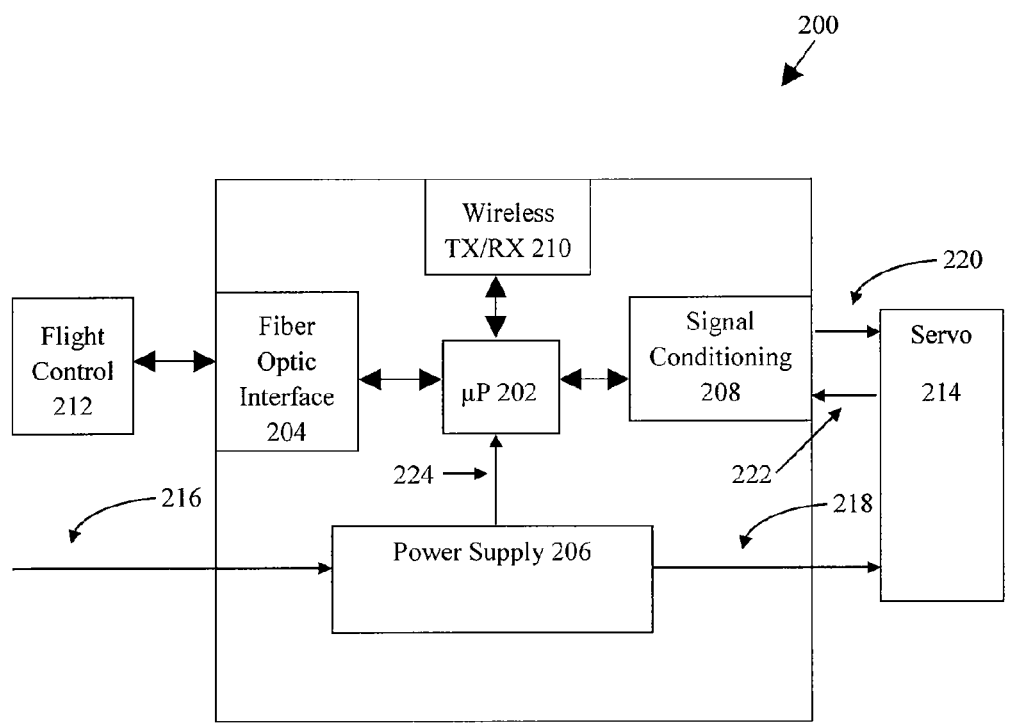
FIG. 2 illustrates an exemplary actuator controller interface.

FIG. 2 is an exemplary actuator interface controller 200. The actuator interface controller 200 may include a local microprocessor 202, a fiber optic interface controller 204, a power supply 206, a signal conditioning unit 208, and a wireless transmitter and/or receiver 210. The actuator interface controller may include additional, fewer, or alternate components.

The microprocessor 202 may be in two-way communication with the fiber optic interface 204, the signal conditioner 208, and the wireless transceiver 210. In turn, the fiber optic interface 204 may be in two-way communication with an aircraft control network, such as a flight control or flight control computer 212. The signal conditioner 208 may be in two-way communication with a remote device, such as a servo controller 214.

The power supply 206 may accept a high voltage from high voltage power busswork 216. The power supply 206 may reduce the high voltage to a first lower voltage 224 and provide the first lower voltage to the microprocessor 202 to power the microprocessor 202. The power supply 206 may also reduce the high voltage to a second lower voltage and place the second lower voltage onto low voltage power busswork 218 to power the remote device 214. In one embodiment, the high voltage may be approximately 350 V, the first lower voltage may be approximately 5 V, and the second lower voltage may be approximately 12 V or approximately 28 V. Other voltages may be used.

The power supply 206 may include a first DC/DC converter that reduces the high voltage on the high voltage power busswork 216 to the first lower voltage powering the microprocessor 202, and a second DC/DC converter that reduces the high voltage on the high voltage power busswork 216 to the second lower voltage powering the low voltage power busswork 218 and the remote device 214.

In an alternate embodiment, the power supply 206 may be a smart power supply and be integrated with a microprocessor. The smart power supply may receive commands from the control network 212 to turn remote devices 214 on and off. Alternatively the interface controller 200 may include a battery or energy harvesting device as either a primary or a secondary source of power, to further enhance reliability.

The signal conditioner 208 may provide for signal conditioning of signals sent to 212, and received from 222, a remote device 214. The signal conditioner 208 may provide active flutter suppression, analog to digital conversion, and/or other signal conditioning. The signal conditioner 208 may accommodate communication with many types of remote devices 214, such as the servo controller shown in FIG. 2 and other auxiliary loads, including those discussed herein.

The fiber optic interface 204 may interconnect the local microprocessor 202 with fiber optic cabling of a control network 212 of the aircraft. In an alternative embodiment, advanced fiber optic cabling itself may act as a remote intelligence gathering device, alleviating the need for certain remote devices located in the wings. In one embodiment, the fiber optic cabling may be manufactured from PhotoCraft Inc.™

Commands from a controller 212 transmitted over fiber optics and received by the fiber optic interface 204 may direct the operation of remote devices 214, such as commanding remote servos to certain positions. Feedback from the remote devices 214 may then be relayed back to the controller 212 via the fiber optic interface 204. In one embodiment, signal level 1-0, or high-low voltage, may command a servo and report feedback on the positioning of the servo.

VII. Exemplary Method

Figure 3:
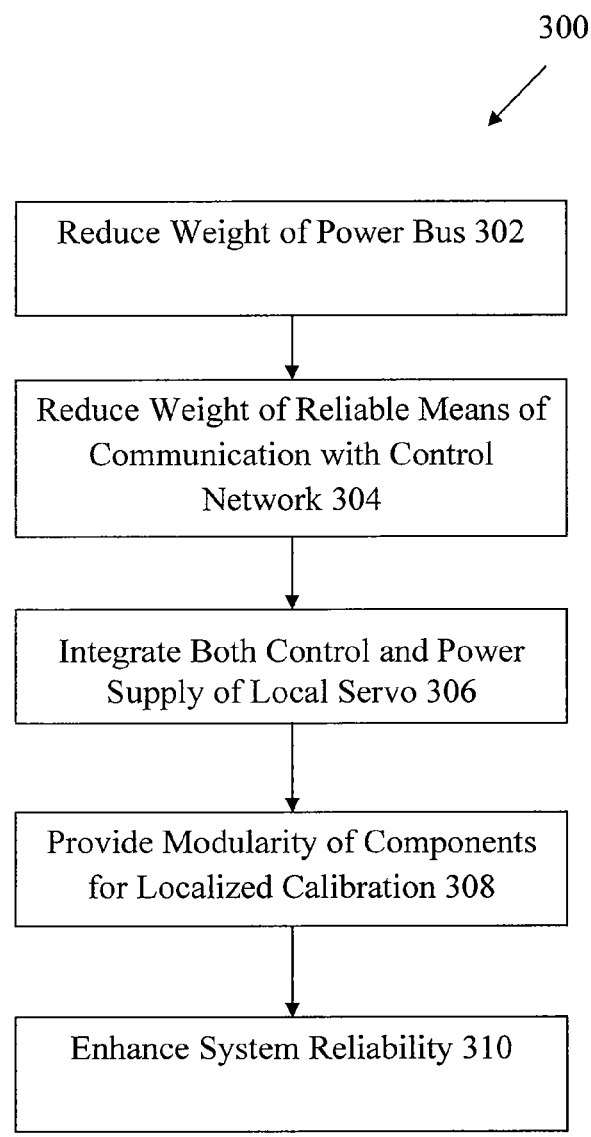
FIG. 3 illustrates an exemplary technique for integrating control of, and supplying power to, a remote device located in the wing of an aircraft.

FIG. 3 illustrates an exemplary method of enhancing endurance and maneuverability of an aircraft 300. The method 300 may include reducing the weight of a power bus 302, reducing the weight of a reliable means of communication with a control network 304, integrating both the control and the power supply of a remote device 306, providing modularity of components for ease of replacement and localized calibration 308, and enhancing system reliability 310. The method may include additional, fewer, or alternate actions.

The method 300 may reduce the weight of a power bus 302 by using (a) small gage wiring for a power bus, such as a high or a low voltage power bus, (b) fiber optic cable, and/or (c) wireless communications. In one aspect, an interface controller may interconnect with both high and low voltage power busswork. A high voltage may be carried via a small, light wire acting as a high voltage power bus. On the hand, a low voltage may be carried on a comparatively larger, heaving wire acting as a low voltage power bus. Transmitting a portion of the power required to power remote devices over the lighter power bus may reduce the weight of the aircraft. In one embodiment, the length of the lighter high voltage power bus transmitting a high voltage may be substantially greater, or at least equal to, the length of the heavier, low voltage power bus transmitting the low voltage.

The method 300 may reduce the weight of a reliable means of communication with a control network 304. The aircraft may include a fiber optic control network that enjoys noise immunity. The control network may use Ethernet technology to operate a local area network within the aircraft. IEEE 802 or other communication standards may be used.

Alternatively, in lieu of a fiber optic system, each local controller may operate as a wireless node in a mesh or other network. Discrete wireless communication may facilitate uncorrupted long distance data and control signal transmission from a main controller to one or more interface controllers. When transmitting from one interface controller to the next, signal reliability may be checked, such as via a checksum, flag, hand shake, or the like. If signal reliability is not confirmed, each interface controller pair may search for a reliable discrete and available frequency. If a reliable frequency is found, the interface controllers may both attempt to re-establish reliable communicate on the new frequency identified as being reliable.

The method 300 may integrate both the control and the power supply of a remote device 306. The remote interface controller may be positioned in the vicinity of the remote device that requires a control signals and/or power to be supplied. The interface controller may interface with a high voltage power bus and/or a fiber optic network of the aircraft. The interface controller may receive a high voltage from the high voltage power bus and control signals from the fiber optic network. Subsequently, the interface controller may convert the high voltage and control signals received into a low voltage power signal and a conditioned control signal, respectively. The low voltage power signal may power, and the conditioned control signals may direct, remote devices interconnected with the interface controller.

The method may include providing modular components 308, as discussed elsewhere herein. For instance, interchangeable modular wing tips, wing components, and tails may be provided. Each modular component may have a dedicated interface controller or remote device. Each interface controller may be interchangeable with another interface controller that is programmed with the same or a different mission package.

Automatic calibration of a remote device may be directed by a local processor located on the interface controller. The local processor may include embedded calibration data and routines corresponding to a remote device located in a modular wing tip, tail, or wing component. For instance, a wing tip or other modular component associated with a previous mission may be replaced with a replacement wing tip or modular component associated with a new mission. The replacement wing tip may include power and control connections that interconnect with an adjoining wing component, such as interconnections with the high voltage power busswork and the control network discussed above.

The replacement wing tip or other modular component may include mission specific interface controllers, remote devices, software, local processors, and other mission specific replacement components. As an example, an interface controller or local processor may be programmed to direct a remote device to gather intelligence, such as video or audio recording, of a specific target of interest identified either before or away take off.

In one embodiment, two or more interface controllers may be run in series to provide a number of stepped down voltages. A high voltage may be stepped down from 350 V to an intermediate voltage, such as 28 V, by a first interface controller. The intermediate voltage may power a first remote device, as well as feed a second interface controller. The second interface controller may then step down the 28 V received from the first interface controller to a low voltage, such as either a 12 V or 5 V low voltage that may power a second remote device.

The method may include enhancing reliability 310. The method may include local power conversion, such as power being stepped down from a relatively high voltage to a comparatively lower voltage in the vicinity of a remote device; localized calibration if a remote device that may facilitate greater modularity; high voltage to low voltage power busswork and wiring; and/or fiber optic interfacing.

Additionally, with conventional device processors, power surges or other external or internal events may cause faults. With the present embodiments, the interface controller may include a local processor with a memory having embedded software. The embedded software may include fault recognition routines. If a fault associated with the interface controller is recognized by the local processor, the local processor may automatically and quickly reboot itself. The faults identified may include power surges, component failure, blown fuses, local processor shut down, and other events. As a result, downtime may be automatically minimized without the need for direct human intervention and the need for manual corrective troubling shooting, which may be time consuming and inefficient, may be alleviated.

VIII. Exemplary Applications

Figure 4:
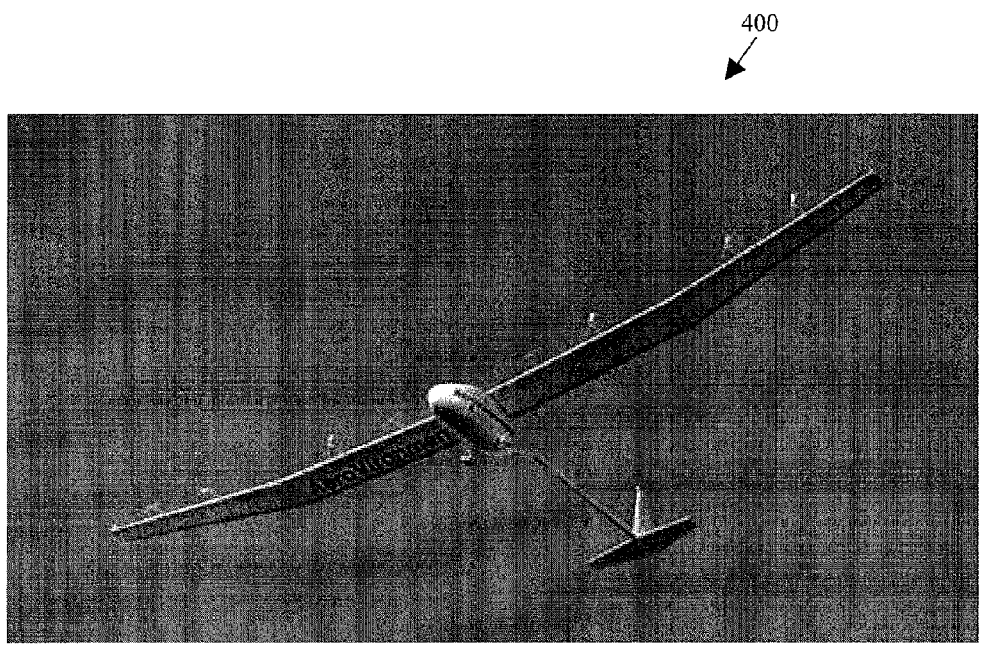
FIG. 4 illustrates an exemplary unmanned drone.

FIG. 4 illustrates an exemplary aircraft 400. The aircraft 400 may be an unmanned drone capable of sustained flight up to 65,000 feet above ground. The drone 400 may operate above air traffic and weather, have over a week-long flight duration, provide station-keeping capabilities, operate in conjunction with backup platforms to ensure continuous and remote intelligence gathering coverage over areas of interest, and may be interconnected directly into an external communications network.

The drone 400 may be a high-altitude, long-endurance unmanned aircraft. The drone 400 may serve as a platform to relay communications and other payloads. The drone 400 may facilitate two-way broadband, voice, and/or narrow band communications. The drone 400 may capture and facilitate the broadcast of video and/or audio. The drone 400 may communicate with (1) fixed user equipment having antennas as small as approximately two inches, (2) gateway stations, (3) the interne, (4) satellite dishes, and (5) mobile user equipment, such as hand-held devices, cell phones, PDAs, laptops, GPS devices, and other devices.

Figure 5:
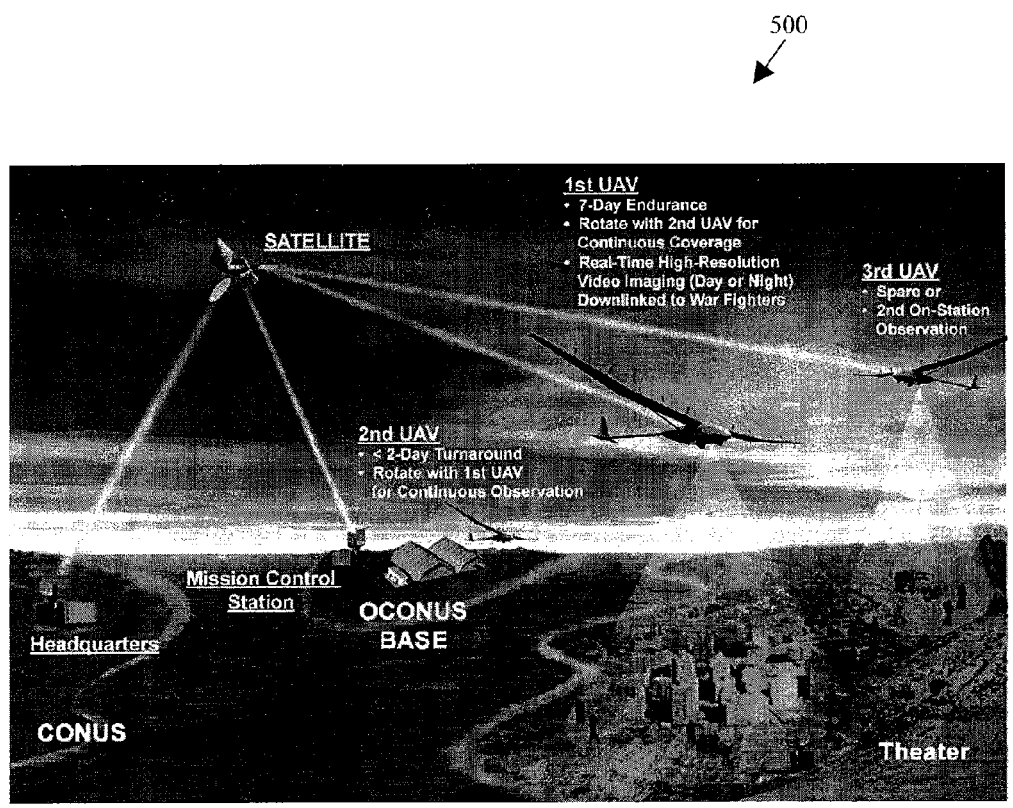
FIG. 5 illustrates an exemplary concept of operations for an unmanned drone.

FIG. 5 illustrates an exemplary concept of operations for the unmanned drone. The unmanned drone may be in communication with a mission control station located on the ground via a satellite link. The reduction of weight that may be provided to the unmanned drone by the present embodiments may facilitate extended observation of a remote region of interest. The unmanned drone may have a 7-day or more endurance and rotate with other unmanned vehicles for continuous theatre coverage. The drone may provide real-time high-resolution video imaging that may be accessible in real-time to combat units—on the ground, in the air, and at sea.

Mission examples for the drone may include persistent stare communications or GPS functionality, detection and location of electromagnetic interference, tactical on-station weather and communication monitoring, dynamic tasking by theatre commanders, communications augmentation, bandwidth expansion, robust coverage to areas with little to no other coverage, gathering persistent and actionable intelligence in real-time, jamming, jammer tracking, missile defense, battle ground and air space awareness, airspace collision avoidance, and dedicated communications support.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed is:

1. A system for supplying power to a remote auxiliary load located in an aircraft,
   a power plant configured to place a high voltage onto a high gage wire;
   an actuator interface controller comprising a power supply, the power supply being interconnected with the high gage wire and a low gage wire, the high gage wire being of higher gage wiring than the low gage wire, where the high gage wire acts as a high voltage power bus and provides the high voltage to the power supply;
   the power supply being configured to step down the high voltage received to a low voltage that is lower than the high voltage on the high voltage power bus, and to place the low voltage onto the low gage wire that acts as a low voltage power bus;
   the low voltage power bus is interconnected with a remote auxiliary load and provides the low voltage to the remote auxiliary load; and
   a local processor located in the actuator interface controller, the local processor being interconnected with a control network via an optic fiber interface;
   where the actuator interface controller is electrically interchangeable with other actuator interface controllers, and the local processor of the actuator interface controller includes mission specific software that facilitates control of the remote auxiliary load, such that depending on a particular mission, one actuator interface controller with a first mission specific software may be physically replaced by a second actuator interface controller with a second mission specific software.

2. The system of claim 1, where the local processor of the actuator interface controller includes a memory with embedded software that facilitates remote calibration of the remote auxiliary load, the remote calibration being directed by the local processor in accordance with the embedded software.

3. The system of claim 1, further comprising:
   a signal conditioner located in the actuator interface controller, the signal conditioner being interconnected with the remote auxiliary load, where the power supply is configured to supply power to the local processor, and the actuator interface controller is configured to control the operation of the remote auxiliary load via the local processor directing the signal conditioner to send control signals to the remote auxiliary load.

4. The system of claim 1, where the actuator interface controller, the remote auxiliary load, and the low gage wire are positioned in a modular wing tip configured to interconnect with an adjoining wing component that provides a connection to the high gage wire.

5. The system of claim 1, where the local processor is configured to continuously run check health routines, and upon detection of a fault due to an external event, to automatically reboot the actuator interface controller.

6. The system of claim 5, where the local processor is further configured to transmit warning alarm signals to the control network in response to detecting the fault.

7. A system for supplying power to a remote device located in an aircraft, the system comprising:
   a power plant configured to place a high voltage onto a high voltage power bus;
   an actuator interface controller interconnected with the high voltage power bus and having a power supply, the power supply configured to reduce the high voltage received from the high voltage power bus to a low voltage that is lower than the high voltage on the high voltage power bus, and to place the low voltage onto a low voltage power bus exiting the actuator interface controller; and
   a remote device interconnected with the low voltage power bus and being powered from the low voltage carried by the low voltage power bus;
   where the actuator interface controller is configured to (1) direct the operation of the remote device and (2) automatically reboot itself upon detecting an event that disrupts normal operation.

8. The system of claim 7, where the actuator interface controller, the remote device, and the low voltage power bus are positioned in a modular wing tip configured to interconnect with an adjoining wing component that provides a connection to the high voltage power bus.

9. The system of claim 7, where power reaches the remote device being located in a wing by traversing a first distance over the high voltage power bus that is greater than a second distance over which the power traverses the low voltage power bus.

10. The system of claim 7, wherein the actuator interface controller comprises:
a local processor interconnected with a control network via a fiber optic interface; and
a signal conditioner configured to send control signals to, and receive feedback signals from, the remote device.

11. The system of claim 10, where the local processor is configured to continuously run check health routines to detect a fault event that disrupts normal operation and to transmit warning alarm signals to the control network in response to detecting the fault.

12. The system of claim 7, wherein the actuator interface controller includes a local processor configured to wirelessly transmit to and receive data from a control network.

13. A method of controlling and supplying power to a remote device located in an aircraft, the method comprising:
providing an interface controller that is interchangeable with other interface controllers;
interconnecting the interface controller with a power plant located in a fuselage of the aircraft and with a remote device located at a remote location of the aircraft;
providing a local processor on the interface controller, the local processor configured to control the remote device and relay feedback from the remote device to a control network of the aircraft;
loading a mission specific interface controller with a mission specific package of software associated with directing the remote device to perform a mission specific operation; and
replacing the interface controller with the mission specific interface controller, wherein the mission specific interface controller is configured to locally calibrate the remote device such that the remote device is calibrated for use with the mission specific interface controller without the need to re-calibrate one or more other remote devices located in a wing of the aircraft that are interconnected with other interface controllers that have not been replaced.

14. The method of claim 13, where the interface controller is interconnected with the power plant with a high gage wire and is interconnected with the remote device with a low gage wire.

15. The method of claim 13, further comprising:
rebooting the local processor on the interface controller automatically if a fault associated with the interface controller is detected.

16. The method of claim 15, further comprising:
continuously run check health routines by the local processor to detect a fault event that disrupts normal operation and to transmit warning alarm signals to the control network in response to detecting the fault.

17. The method of claim 13, further comprising:
providing a fiber optic interface for communication between the local processor on the interface controller with the control network of the aircraft.

18. The method of claim 13, further comprising:
providing the interface controller, the remote device, and the low gage wiring in a modular wing tip configured to interconnect with an adjoining wing component that provides a connection to the high gage wiring.

19. The method of claim 13, further comprising:
locally calibrating an individual remote device via calibration routines and data embedded on the interface controller.

* * * * *